M. HALFPENNY.
DEMOUNTABLE RIM FOR AUTOMOBILE OR OTHER WHEELS.
APPLICATION FILED OCT. 2, 1911.
1,031,259.
Patented July 2, 1912.
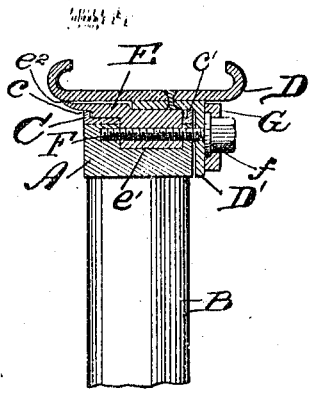
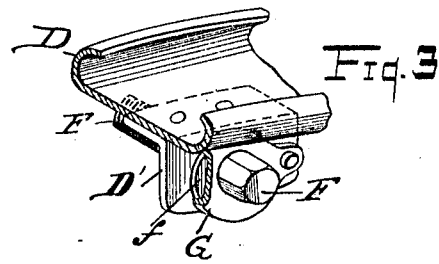
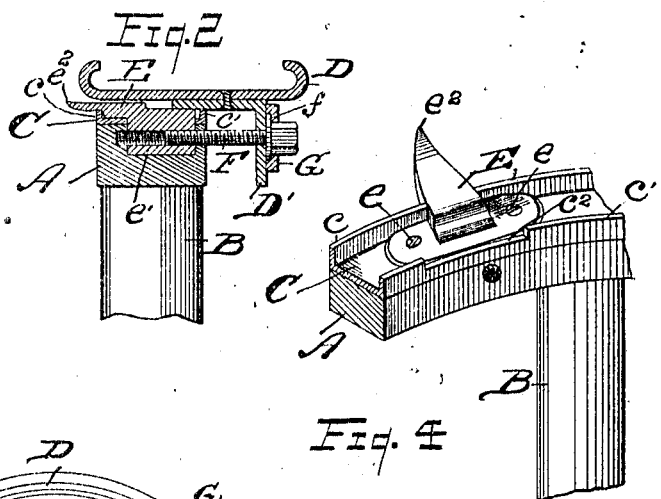
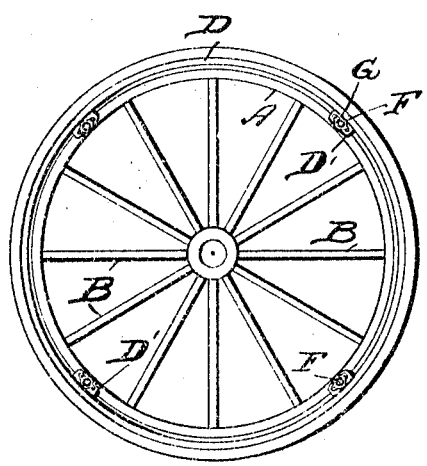
Witnesses
Grace E. Wynkoop
John E. Lebret
Inventor
Martin Halfpenny
By S. S. Thomas
Attorney

UNITED STATES PATENT OFFICE.

MARTIN HALFPENNY, OF PONTIAC, MICHIGAN.

DEMOUNTABLE RIM FOR AUTOMOBILE OR OTHER WHEELS.

1,031,259.  Specification of Letters Patent.   Patented July 2, 1912.

Application filed October 2, 1911. Serial No. 652,431.

*To all whom it may concern:*

Be it known that I, MARTIN HALFPENNY, a citizen of the United States, residing at Pontiac, county of Oakland, State of Michigan, have invented a certain new and useful Improvement in Demountable Rims for Automobile or other Wheels, and declare the following to be a full, clear, and exact description of the same, such as will enable others skilled in the art to which it pertains to make and use the same, reference being had to the accompanying drawings, which form a part of this specification.

My invention relates to an improvement in demountable rims for automobile or other vehicle wheels, shown in the accompanying drawings and more particularly pointed out in the following specification and claim.

The object of my invention is to provide a quickly demountable rim adapted to carry an auxiliary pneumatic tire which may be substituted for the tire and rim in use in the event of a puncture,—the construction being such that the rim installed may be forced off the felly through the action of the attaching bolts by which the rim is secured thereto.

In the drawings accompanying this specification:—Figure 1 is a fragmentary cross-sectional view through the felly and rim of a wheel, showing one of the several attaching bolts employed to secure the rim to the felly. Fig. 2 is a similar view indicating the rim being forced from the felly through the action of the flange on the attaching bolt. Fig. 3 is a fragmentary perspective view of the removable rim and one of the bolt supporting angle plates, with parts broken away and in section to more clearly disclose the construction. Fig. 4 is a fragmentary perspective view of a metallic rim rigidly secured to the wooden felly, showing one of the brackets attached thereto for supporting the outer edge of the removable rim. Fig. 5 is a side elevation of a wheel with the removable rim in position.

Referring now to the letters of reference placed upon the drawings:—A is the wooden felly. B the spokes of a wheel. C is a metallic rim secured to the wooden felly, having upturned flanges $c$, $c'$.

D is a removable rim to the underface of which are riveted or otherwise secured a plurality of angle plates D' preferably spaced equidistantly throughout the rim.

A plurality of brackets E, are respectively set in mortises formed in the metallic rim C for their reception, being secured to the rim by rivets or screws $e$. The downwardly projecting lug $e'$ of the bracket being tapped to receive a bolt F supported in the depending flange of the angle plate D'. The bolt F is provided with a flange $f$ lodged between the cup-shaped plate G, and the depending flange of the angle plate D', to which the plate G is engaged. The projecting end $e^2$ of the brackets E, extends through a recess formed in the flange $c$ of the rim C and is upwardly inclined to provide a bearing surface for the removable rim when the latter is forced into position over the felly. The flange $c'$ is cut away at $c^2$ to permit the entry of the web of the angle plate D', secured to the underside of the removable rim.

Having denoted the several parts by reference letters, the construction and operation of the device will be readily understood.

To engage the removable rim with the wheel, the rim is first brought into position to encircle the felly, the bolts are then engaged with the tapped lug of the several supporting brackets by the use of a brace wrench or other suitable tool; thereby forcing the rim into position upon the felly.

To remove the rim, the bolts are rotated in the reverse order to that just described which action due to the projecting flanges $f$ of the bolt bearing against the cup-shaped plates G, forces the removable rim from the felly, overcoming any tendency there may be of the rim binding thereon.

Having thus described my invention, what I claim is:—

In a wheel, a fixed rim, brackets secured to the fixed rim having inwardly projecting tapped lugs set in mortises formed in the rim and each provided with a projecting finger curved outwardly adapted to bear against and support the outer edge of a removable rim, the removable rim, angle plates secured to the removable rim, a bolt supported in each of the angle plates adapted to engage the tapped lugs of the brackets, said bolts each provided with an outwardly projecting flange, and a plurality of plates pierced for the passage of the bolt secured to the respective angle plates to house the flange of the bolt between said plates and the angle plates.

In testimony whereof, I sign this specification in the presence of two witnesses.

MARTIN HALFPENNY.

Witnesses:
GRACE E. WYNKOOP,
SAMUEL E. THOMAS.